United States Patent Office 3,378,531
Patented Apr. 16, 1968

3,378,531
LACQUER COMPOSITIONS HARDENABLE TO A POLYURETHANE LACQUER PREPARED FROM DIMERIZED OR TRIMERIZED FATTY ALCOHOLS OR THE ALKYLENE OXIDE ADDUCTS THEREOF
Arnold Heins, Hilden, Rhineland, Wilhelm Offermann, Dusseldorf, and Heinz Linden, Dusseldorf-Holthausen, Germany, assignors to Henkle & Cie, G.m.b.H., Dusseldorf-Holthausen, Germany, a corporation of Germany
No Drawing. Filed Jan. 28, 1964, Ser. No. 340,829
Claims priority, application Germany, Mar. 6, 1963, H 48,442
3 Claims. (Cl. 260—77.5)

ABSTRACT OF THE DISCLOSURE

Lacquer compositions hardenable to a polyurethane lacquer comprising (1) polyhydric alcohols selected from the group consisting of (a) dimeric higher fatty alcohols having from 16 to 44 carbon atoms, (b) trimeric higher fatty alcohols having from 24 to 66 carbon atoms, (c) mixtures thereof, and (d) mixtures thereof with up to 50% by weight of lower alkylene oxide addition products of the aforesaid dimeric and trimeric higher fatty alcohols, (2) polyisocyanates selected from the group consisting of alkane-polyisocyanates, aromatic hydrocarbon polyisocyanates, addition products of the aforesaid polyisocyanates with polyhydric low molecular weight alcohols and mixtures thereof, where said polyisocyanates contain at least two isocyanate groups per molecule, and (3) inert organic solvents.

The use of lacquers based on polyvalent isocyanates and polyesters containing free hydroxyl groups, which have been prepared by esterification of dicarboxylic acids with di- and tri-hydric alcohols, as protective coatings for a variety of materials is well known. However, due to the ester grouping the coatings thus produced exhibit disadvantages with respect to their resistance against hydrolysis.

It is further known to combine polyglycol ethers containing free hydroxyl groups with polyvalent isocyanates to give hardenable products, which may also be used as lacquers. These coating compositions are also subject to attack by aqueous solutions of chemicals.

An object of the present invention is the preparation of saponification-resistant polyurethane lacquers with good mechanical properties.

Another object of the present invention is the preparation of a lacquer composition hardenable to a polyurethane lacquer comprising (1) polyhydric alcohols selected from the group consisting of (a) dimeric higher fatty alcohols, (b) trimeric higher fatty alcohols, (c) mixtures thereof, and (d) mixtures thereof with up to 50% by weight of alkylene oxide addition products selected from the group consisting of lower alkylene oxide addition products of dimeric higher fatty alcohols containing up to 12 lower alkylene oxide units, lower alkylene oxide addition products of trimeric higher fatty alcohols containing up to 12 lower alkylene oxide units, and mixtures thereof, (2) poly-isocyanates selected from the group consisting of alkane-polyisocyanates, aromatic hydrocarbon poly-isocyanates, addition products of alkane-polyisocyanates with polyhydric low molecular weight alcohols, addition products of aromatic hydrocarbon polyisocyanates with polyhydric low molecular weight alcohols, and mixtures thereof, of said polyisocyanates containing at least two isocyanate groups per molecule and free from other reactive substituents, and (3) inert organic lacquer solvents.

These and other objects of the invention will become more apparent as the description thereof proceeds.

It has now been found that saponification-resistant polyurethane lacquers with good mechanical properties are obtained by using as the hydroxyl group containing component, a dimerized and/or trimerized higher fatty alcohol, alone or possibly with concurrent use of their alkylene oxide addition products. The above-mentioned higher fatty alcohols are preferably employed as the sole hydroxyl group containing component. If desired, however, minor amounts of other known substances containing hydroxyl groups suitable for the preparation of polyurethane lacquers may also be used concurrently.

The dimeric and/or trimeric higher fatty alcohols are commercially known substances and may be prepared by known methods, for instance, by catalytic hydrogenation of dimeric or trimeric higher fatty acid esters. They are also accessible, for instance, by dimerization or trimerization of unsaturated higher fatty alcohols. Since the higher fatty acids or higher fatty alcohols which are used as starting materials contain from 8 to 22 carbon atoms and on the average about 18 carbon atoms, diols or triols with about 36 or about 54 carbon atoms are formed. Commercial, technical grade mixtures of the dimeric and trimeric higher fatty alcohols may be employed with good success for the polyurethane lacquers according to the present invention. Such mixtures, for instance, exhibit a content of about 10 to 90% of dimeric and 90 to 10% of trimeric alcohol. Technical grade mixtures often still contain minor amounts of monomeric higher fatty alcohol and have hydroxyl numbers of about 180 to 210.

The dimerized and/or trimerized higher fatty alcohols may, if desired, be partially replaced by their lower alkylene oxide addition products, where no more than 12, and especially 5 to 8 mols of a lower alkylene oxide, preferably either propylene oxide or ethylene oxide should be added per mol of dimer and/or trimer higher fatty alcohol. By the addition of lower alkylene oxide addition product of the dimer and/or trimer higher fatty alcohol, which should, however, not exceed 50% of the total amount of the hydroxyl group containing component, the shininess and the flexibility of the lacquer coatings obtained thereby are improved.

Suitable polyisocyanate compounds are the customary technically available materials, preferably are the alkane-polyisocyanates and the aromatic hydrocarbon polyisocyanates, the customary aliphatic or aromatic di- or polyisocyanates, such as hexamethylene di-isocyanate, toluylene di-isocyanate, p,p'-diphenyl di-isocyanate, p,p'-diphenylmethane di-isocyanate, p-phenylene di-isocyanate, p,p',p''-triphenylmethane tri-isocyanate and their addition products with polyhydric low molecular weight alcohols, such as the adition product of toluylene di-isocyanate to trimethylolpropane in a molecular ratio of 3:1. Said polyisocyanate component may be a mixture of any of the above compounds. However, it must contain at least two isocyanate groups per molecule and be free from other reactive substituents.

For preparation of the polyurethane lacquer compositions according to the present invention, the two components are individually dissolved in a suitable inert organic lacquer solvent, such as ethyl acetate, ethyleneglycol-di-acetate, toluene, benzene, xylene, methylenechloride, dioxane and the like, or mixtures thereof, and the solution containing the hydroxyl group containing component is admixed with the corresponding amount of the solution of the polyisocyanate component. Depending upon the purpose of application, either a stoichiometric amount or a slight excess or also a slight deficiency of the polyisocyanate component is used. If desired, accelerators such as tertiary amines or their acid salts may be added.

The polyurethane lacquer compositions according to the present invention are compatible with pigments, such as zinc yellow, titanium dioxide and talcum, and may be applied in customary fashion to the dry surfaces to be coated by spraying, painting or immersion. Depending upon the selection of the polyisocyanate component, solvent system and the other additives, the lacquer hardens at room temperature in about one to four hours into a bone-dry coating. The lacquer coatings acquire their ultimate hardness in about 3 to 5 days. Of course, the hardening may, if desired, be brought about at elevated temperatures in correspondingly shorter periods of time.

With the polyurethane lacquer compositions according to the present invention it is possible to obtain firmly adhering coatings on metals, such as steel, iron, copper and aluminum, as well as on wood, rubber, plastics, textiles and paper. The lacquer films are characterized by good spreading properties, high brilliance and resistance against abrasion. Most noteworthy is their resistance against elongation and impacted stresses and especially their resistance against hydrolyzing chemicals, especially solutions of alkaline reacting substances.

The following examples will further illustrate the present invention and enable others skilled in the art to understand the invention more completely. It is to be understood, however, that the following examples are not to be construed as limitations on the practice of the invention.

EXAMPLE I

Dimeric higher fatty alcohol, obtained by dimerization of the methyl esters of unsaturated higher fatty acids (having an average chain length of 18 carbon atoms) and subsequent reduction of the ester group into the alcohol group, said dimeric higher fatty alcohol containing about 20% trimeric higher fatty alcohol and having a hydroxyl number of 200, was dissolved in a mixture of equal parts by weight of ethyl acetate, butyl acetate, ethyleneglycol diacetate and toluene. The solution was admixed with an amount corresponding to the hydroxyl content plus a 3% excess of a commercial 75% solution of the addition product of toluene diisocyanate to trimethylpropylol (molecular ratio 3:1) in ethyl acetate so that an about 50% solution (A) resulted. This solution was allowed to stand at room temperature for one and a half hours, and then clear films of about 250μ thickness were produced on a glass plate by allowing 12 cc. of the solution to flow out. After two hours of storage at 60 to 70° C. the films were carefully removed and were further hardened for two additional hours at the same temperature.

In the same manner a solution of trimeric higher fatty alcohol, obtained by trimerization of the methyl esters of unsaturated higher fatty acids ($C_{18}$) and subsequent reduction of the ester group to the alcohol group, said trimeric higher fatty alcohol containing 20% of dimeric higher fatty alcohol and having a hydroxyl number of 190, was admixed with a 3% excess, based on the hydroxyl number, of the same polyisocyanate as above to form a 50% solution (B). After one and a half hours of standing, clear films were poured in the same manner as described above, and these films were further hardened.

For comparison, corresponding amounts of a commercial polyester of adipic acid, phthalic acid and trihydric alcohol with a hydroxyl number of 290, known under the tradename "Desmophen 800" (Solution C) and of another commercial polyester of adipic acid, di- and trihydric alcohol and butyleneglycol with a hydroxyl number of 210, known under the trade-name "Desmophen 1100" (Solution D) was used in place of the dimeric or trimeric higher fatty alcohols, respectively. Clear films were poured in the same manner as above from these polyurethane solutions, and the films were hardened at 60 to 70° C.

The mechanical properties, such as tensile strength, notch toughness, elongation and abrasion, were good in all clear films and did not noticeably differ. The hardness of the films prepared from solutions A and B was increased over that of solutions C and D. The resistance of the films prepared from the four different polyurethane solutions against various chemicals is shown in the following table:

| | A | B | C | D |
|---|---|---|---|---|
| Boiling water, 24 hours | Unchanged | Unchanged | Slightly whitish, moderately brittle. | Strongly brittle. |
| 20% ammonia at about 60° C., 16 hours. | do | do | Slightly whitish, strongly brittle. | Begins to turn whitish, brittle. |
| 50% acetic acid, 100° C., 16 hours. | do | Beginning discoloration, otherwise unchanged. | Strong dark coloration, beginning to become tacky. | Strong dark discoloration with white spots. |
| 20% Sodium hydroxide, 103° C., 5 hours. | do | Unchanged | After ½ hour completely decomposed. | After ½ hour completely decomposed. |
| 25% Sulfuric acid, 104° C., 5 hours. | do | do | Slightly whitish, beginning brittleness. | Slightly whitish, beginning brittleness. |

EXAMPLE II

Sheet steel (0.3 and 1.0 mm.) was rubbed clean with emery, degreased with solvents, and a customary adherence base of about 3 to 4μ based on polyvinylbutyral, zinc chromate and phosphoric acid was applied. Thereafter, three pigmented polyurethane lacquer films were applied. The solvent was a mixture of about 9 parts toluene, 7 parts ethyleneglycol diacetate and 4 to 7 parts butyl acetate and minor amounts of ethyl acetate, in order to adjust a suitable viscosity of the lacquer solution.

(a) *Priming.*—A pigmented priming lacquer (zinc yellow, titanium dioxide, talcum), which contained a dimeric higher fatty alcohol (see Example I) as a binder containing OH groups and the addition of product of 3 mols of toluene di-isocyanate to trimethylolpropane as the isocyanate component which is customarily used in conjunction with isocyanate lacquers, was prepared and was sprayed onto the pretreated sheet metal. 75% of the equivalent amount of the isocyanate component corresponding to the hydroxyl content was used for the priming.

(b) *Intermediate coating.*—For this intermediate coating a combination of the same components as for the priming lacquer was used, but titanium oxide was employed as the sole pigment and 85% of the equivalent amount of the isocyanate component corresponding to the hydroxyl content was used.

(c) *Covering lacquer.*—This lacquer was prepared in customary fashion and contained titanium dioxide as the sole pigment as well as the dimeric higher fatty alcohol and the equivalent amount of the above toluene di-isocyanate addition product to trimethylolpropane, as a binder.

All of the coatings dried rapidly, namely, in the same period of time as other known or commercial lacquers based on polyesters containing hydroxyl groups and polyisocyanates. The samples were bone-dry within one and a half to four hours.

The adherence, the abrasion-resistance and the hardness of the lacquer films thus obtained were good and were equal to known systems. The values for elasticity of the coating (Erichson-deepening, impact-deepening) were superior to those of known isocyanate lacquer composition. The resistance of the lacquer coatings against aqueous acids and alkalis was outstanding and far exceeded that of known systems. The brilliance and gloss retention of the lacquer films were good. After 60 days of storage at room temperature in 20% sodium hydroxide solution the lacquer films were still unchanged.

Further, a trimeric higher fatty alcohol according to Example I was used in equivalent amount in place of the dimeric higher fatty alcohol, and the lacquer coating was accomplished in exactly the same manner. The results were practically the same.

EXAMPLE III

The following were dissolved in mixtures of approximately equal parts of butyl acetate, ethyleneglycol diacetate and toluene:

(a) 26.5 gm. of dimeric higher fatty alcohol (see Example I),
(b) 26.5 gm. of trimeric higher fatty alcohol (see Example I),
(c) 13.25 gm. of dimeric and trimeric higher fatty alcohol.

Each of these solutions was admixed with 80% of the equivalent amount of a 75% solution of an addition product of 3 mols of toluene di-isocyanate and trimethylolpropane, so that 100 gm. of solution were obtained. Each of these solutions was applied with a paintbrush on beechwood planks (10 x 20 cm.). After drying overnight, the same solution was applied four times more on the primer coat, but with the difference that equivalent amounts of polyisocyanate were used. Each application was allowed to harden for 24 hours and in between times the films were abraded with emery. Spreading properties, hardness and abrasion resistance of the samples were good.

EXAMPLE IV 10.8 gm. of dimeric higher fatty alcohol according to Example I and 21.6 gm. of a propyleneoxide addition product to this alcohol (7 mols of propyleneoxide per mol of alcohol) were dissolved in a mixture of the following solvents:

| | Parts by weight |
|---|---|
| Ethyl acetate | 20 |
| Butyl acetate | 22.5 |
| Ethyleneglycol diacetate | 30 |
| Cyclohexanone | 2.5 |
| Toluene | 25 |

The equivalent amount of the toluene di-isocyanate addition product to trimethylolpropane (3:1) was added thereto as a cross-linking agent and the mixture was allowed to stand for one and a half hours. Large (10 x 10 cm.) flexible pieces of rubber, which were previously cleaned with toluene, were lacquered with this solution by a single spray.

Testing of these samples was carried out after two weeks of storage at room temperature and showed excellent spreading properties and brilliance. The bending strength was good.

The preceding examples are illustrative of the invention. It is to be understood, however, that this specific embodiment is non-limiting and other alternative procedures, as would occur to those skilled in the art, can be employed without departing from the spirit of the invention or the scope of the appended claims.

We claim:
1. A lacquer composition hardenable to a polyurethane lacquer comprising a solution of (1) polyhydric alcohols selected from the group consisting of (a) dimeric higher fatty alcohols having from 16 to 44 carbon atoms, (b) trimeric higher fatty alcohols having from 24 to 66 carbon atoms, (c) mixtures thereof, and (d) mixtures thereof with up to 50% by weight of alkylene oxide addition products selected from the group consisting of lower alkylene oxide addition products of dimeric higher fatty alcohols having from 16 to 44 carbon atoms containing up to 12 lower alkylene oxide units, lower alkylene oxide addition products of trimeric higher fatty alcohols having from 24 to 66 carbon atoms containing up to 12 lower alkylene oxide units, and mixtures thereof, and (2) polyisocyanates selected from the group consisting of alkane-polyisocyanates, aromatic hydrocarbon polyisocyanates, addition products of alkane-polyisocyanates with polyhydric low molecular weight alcohols, addition product of aromatic hydrocarbon polyisocyanates with polyhydric low molecular weight alcohols, and mixtures thereof, said polyisocyanates containing at least two isocyanate groups per molecule and free from other reactive substituents, in (3) inert organic lacquer solvents.

2. The lacquer composition hardenable to a polyurethane lacquer of claim 1 wherein lacquer pigments are also incorporated.

3. A lacquer composition hardenable to a polyurethane lacquer comprising a solution of (1) as polyhydric alcohol component, a mixture of dimeric and trimeric higher fatty alcohols prepared from monomeric unsaturated higher fatty acids having an average chain length of 18 carbon atoms, and (2) as polyisocyanate component, the addition product of 3 mol of toluene di-isocyanate with 1 mol of trimethylolpropane, in (3) inert organic lacquer solvents.

References Cited

UNITED STATES PATENTS 3,068,254   12/1962   Le Bras et al. _____ 260—2.5

DONALD E. CZAJA, Primary Examiner.

C. W. RAUCHFUSS, H. A. COCKERAM,
Assistant Examiners.